(12) United States Patent
Lau et al.

(10) Patent No.: US 8,692,431 B2
(45) Date of Patent: Apr. 8, 2014

(54) PERMANENT MAGNET ROTOR

(75) Inventors: James Ching Sik Lau, Hong Kong (CN); Jun Yang, Shenzhen (CN); Wan Mei He, Shenzhen (CN)

(73) Assignee: Johnson Electric S.A., Murten (CH)

( * ) Notice: Subject to any disclaimer, the term of this patent is extended or adjusted under 35 U.S.C. 154(b) by 426 days.

(21) Appl. No.: 12/778,596

(22) Filed: May 12, 2010

(65) Prior Publication Data

US 2010/0289367 A1 Nov. 18, 2010

(30) Foreign Application Priority Data

May 12, 2009 (CN) .......................... 2009 1 0107313

(51) Int. Cl.
*H02K 1/27* (2006.01)
*H02K 1/30* (2006.01)
*H02K 5/24* (2006.01)
*H02K 21/12* (2006.01)
*H02K 21/14* (2006.01)
*H02K 1/28* (2006.01)

(52) U.S. Cl.
CPC .. *H02K 1/30* (2013.01); *H02K 1/28* (2013.01); *H02K 1/276* (2013.01); *H02K 1/278* (2013.01); *H02K 21/14* (2013.01); *H02K 5/24* (2013.01)
USPC ............... 310/156.22; 310/51; 310/156.08; 310/156.09; 310/156.12; 310/156.61; 310/156.72; 310/216.114

(58) Field of Classification Search
CPC ..... H02K 1/28; H02K 1/2726; H02K 1/2786; H02K 23/04; H02K 1/276; H02K 1/278; H02K 1/30; H02K 5/24
USPC ............ 310/51, 156.09, 156.12, 156.22, 310/156.72, 216.114, 156.08, 156.61
IPC .................. H02K 1/28,1/2726, 1/2786, 23/04, H02K 1/276, 1/278, 1/30, 5/24
See application file for complete search history.

(56) References Cited

U.S. PATENT DOCUMENTS

| | | | | |
|---|---|---|---|---|
| 3,484,635 | A * | 12/1969 | Mackallor, Jr. ............... | 310/266 |
| 4,568,846 | A * | 2/1986 | Kapadia .................... | 310/156.83 |
| 5,010,266 | A * | 4/1991 | Uchida .................... | 310/156.22 |
| 5,091,668 | A * | 2/1992 | Cuenot et al. ............ | 310/156.61 |
| 6,426,576 | B1* | 7/2002 | Varenne .................... | 310/156.09 |
| 2006/0158053 | A1* | 7/2006 | Aschoff et al. .................. | 310/91 |
| 2007/0138889 | A1* | 6/2007 | Maldener et al. ......... | 310/156.22 |
| 2007/0138890 | A1* | 6/2007 | Yu ............................. | 310/156.22 |
| 2007/0267924 | A1* | 11/2007 | Dellinger ........................ | 310/51 |
| 2009/0195101 | A1* | 8/2009 | Yang et al. .............. | 310/156.22 |
| 2009/0284094 | A1* | 11/2009 | Horng et al. ............. | 310/156.22 |
| 2009/0309448 | A1* | 12/2009 | Yang et al. .............. | 310/156.22 |
| 2010/0289367 | A1* | 11/2010 | Lau et al. ................. | 310/156.09 |

FOREIGN PATENT DOCUMENTS

| | | |
|---|---|---|
| CN | 101299551 A | 11/2008 |
| JP | 4168944 A | 6/1992 |
| JP | 6098489 A | 4/1994 |

* cited by examiner

*Primary Examiner* — John K Kim
(74) *Attorney, Agent, or Firm* — Muncy, Geissler, Olds & Lowe, P.C.

(57) ABSTRACT

A permanent magnet rotor including a shaft, a rotor core fixed to the shaft, a magnet disposed around the core, and a linker fixed relative to the shaft and located at one end of the core. An elastic clamping structure is arranged between the linker and the magnet such that rotational torque of the magnet is transferred to the shaft via the linker.

13 Claims, 3 Drawing Sheets

PERMANENT MAGNET ROTOR

CROSS REFERENCE TO RELATED APPLICATIONS

This non-provisional patent application claims priority under 35 U.S.C. §119(a) from Patent Application No. 200910107313.6 filed in The People's Republic of China on May 12, 2009.

FIELD OF THE INVENTION

The invention relates to the electric motors, and in particular, to a permanent magnet rotor of a brushless DC motor.

BACKGROUND OF THE INVENTION

A permanent magnet brushless DC motor usually comprises a shaft, a rotor core fixed to the shaft and one or more magnets disposed around the core. In the prior art, the magnet and the rotor core are usually attached by a binder such as an epoxy resin. The binder is used as a torque transfer structure between the magnet and the rotor core for transferring the rotational torque of the magnet to the shaft, thereby driving the shaft.

However, adhesion by means of a binder has following disadvantages:

1) With changes in temperature and prolongation of the duration of usage, the binder is easily aged and may lose its adhesive strength, thereby resulting in failure of the rotor.

2) The manufacturability is poor. A paste binder is difficult to apply evenly, in production which easily results in the magnet being eccentrically mounted to the rotor core, thereby generating one extra factor affecting the imbalance of the rotor.

Hence, it is desirable to develop a new torque transfer structure between the magnet and the core.

SUMMARY OF THE INVENTION

To solve the above problem, the present invention provides a permanent magnet rotor comprising: a shaft, a rotor core fixed to the shaft, a magnet disposed around the core, and a linker fixed relative to the shaft and located at one end of the core; wherein an elastic clamping structure is arranged between the linker and the magnet such that rotational torque of the magnet can be transferred to the shaft via the linker.

Preferably, the elastic clamping structure comprises recesses formed in one end of the magnet proximate the linker and elastic pins arranged on one side of the linker facing the magnet, said elastic pins being resiliently pressed against side walls of the recesses by means of elastic deformation of the pins caused by pressing the pins into the recesses.

Preferably, the recesses have side walls which are divergent with the axially inner side being narrower than the axially outer open side, and an axial slot is formed through the distal end of each of the elastic pins.

Preferably, the linker is made of plastic or a combination of plastic and fiber.

Preferably, the magnet is a unitary hollow cylinder and the recesses are arranged uniformly in the circumferential direction of the magnet and through the wall of the magnet in the radial direction of the magnet.

Preferably, a plurality of grooves are formed on the outer surface of the rotor core, a plurality of positioning pins are arranged on the side of the linker facing the magnet, and positioning pins are located in the grooves and have axially extending surfaces on which a plurality of teeth are formed, the teeth resiliently press against the inner surface of the magnet.

Preferably, a plurality of ridges are formed on the surface of the positioning pins in contact with the grooves so that the positioning pins resiliently grip the grooves.

Preferably, a mounting hole is formed in the center of the linker and the shaft passes through the mounting hole.

Preferably, a plurality of balance pins are arranged on the side of the linker remote from the magnet.

Preferably, the rotor further comprises a second linker fixed to the other end of the core and said second linker and the magnet are connected by means of elastic fixation.

Advantages of embodiments of the present invention include that the linker and the magnet is fixed together by means of an elastic clamping structure while the traditional way of fixation by means of binder is avoided. The way of connection is simple, convenient, reliable and has good manufacturability and repeatability; the inner diameter of the magnet can have a relatively large tolerance because teeth formed on the surface of the positioning pins arranged on the linker press against the inner surface of magnet; and balance pins arranged on the linker can be used for dynamic balancing of the rotor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical problem to be solved, the technical solution and the beneficial effects of the present invention are best understood from the following detailed description with reference to the accompanying figures and embodiments. It is to be understood that the specific embodiments described here are merely examples to explain the invention and are not intended to limit the scope of the present invention.

Figure 1:
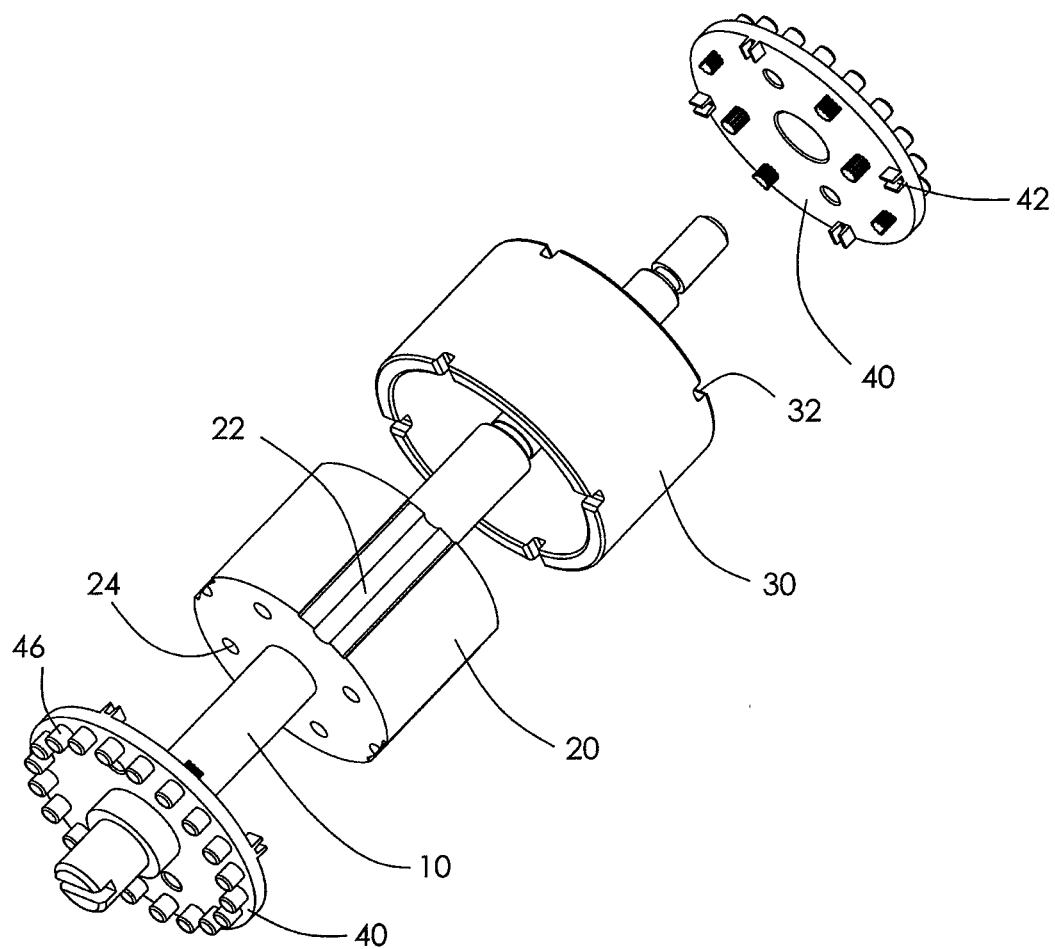
FIG. 1 is an exploded view of the motor rotor in accordance with an embodiment of the present invention.

Referring to FIG. 1, a motor rotor according to the preferred embodiment of the present invention comprises a shaft 10, a rotor core 20 fixed to the shaft 10, a magnet 30 disposed around the core 20, and a linker 40 fixed to one end of the core 20. An elastic clamping structure is arranged between the linker 40 and the magnet 30 such that rotational torque of the magnet 30 is transferred to the shaft 10 via the linker 40 and the core 20.

Figure 2:
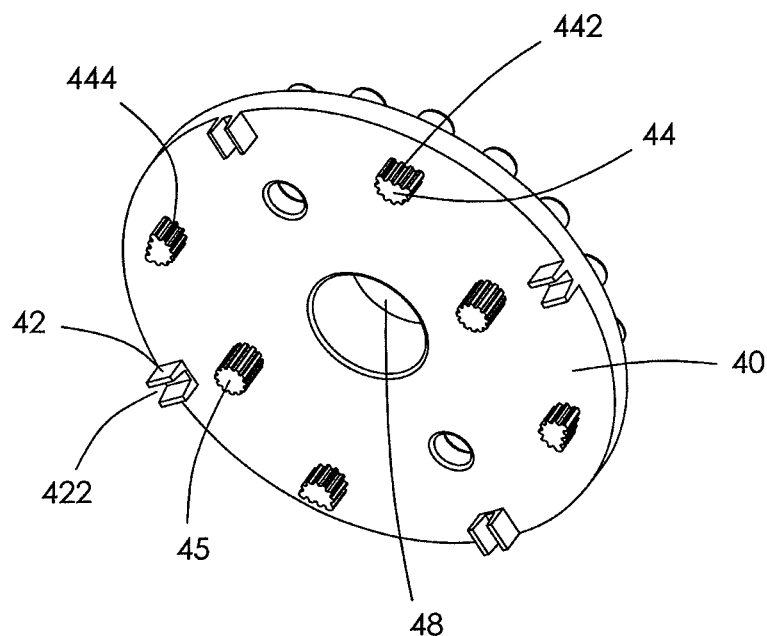
FIG. 2 is an enlarged perspective view of the linker of the motor rotor in accordance with an embodiment of the present invention.
Figure 3:
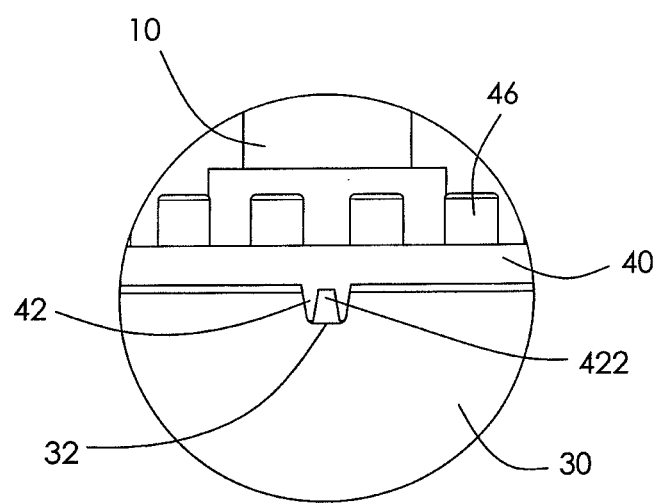
FIG. 3 is a partial enlarged view of the assembling drawing of the motor rotor in accordance with an embodiment of the present invention.

Referring to FIG. 2 and FIG. 3, optionally, recesses 32 are formed on one end of the magnet 30 proximate the linker 40. Elastic pins 42 are arranged on the side of the linker 40 facing the magnet 30 and extend into the recesses 32. The pins press against the side walls of the recesses due to elastic deformation force of the pins as they are pressed into the recesses. Preferably, side walls of the recesses are divergent such that the axially inner end of the recess is narrower that the open axially outer end. Thus the recesses 32 are preferably trapezoidal in shape so that the pins 42 can be guided into the recesses 32 easily. An axial slot 422 is formed through the distal end of elastic pin 42 so that the elastic pin 42 can generate an elastic deformation force after being inserted into the recess 32 and press against the side walls of the recess 32 reliably. The recesses 32 and elastic pins 42 form the elastic clamping structure for fixing the magnet 30 with the linker 40. Preferably, the magnet 30 is a unitary hollow cylinder and the recesses 32 are arranged uniformly in the circumferential direction of the magnet. In this embodiment, the number of the recesses 32 is four and uniformly spaced apart by 90 degrees. Each recess 32 extends through the wall of the magnet 30 in the radial direction of the magnet.

Figure 4:
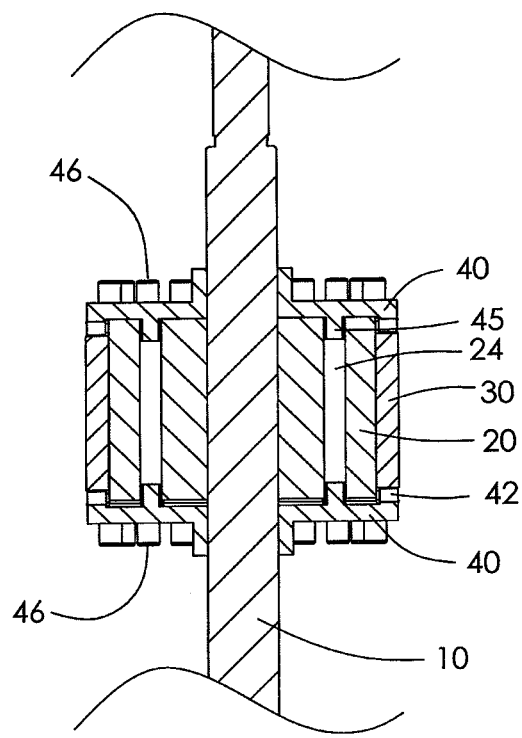
FIG. 4 is a cross sectional view of the motor rotor in accordance with an embodiment of the present invention.
Figure 5:
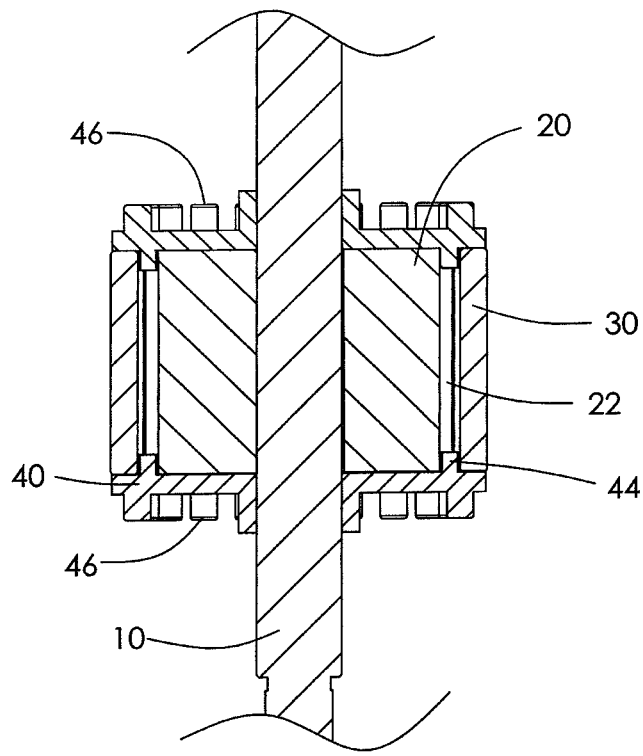
FIG. 5 is another cross sectional view of the motor rotor in accordance with an embodiment of the present invention.

Referring to FIG. 4 and FIG. 5, the linker 40 is made of plastic or a combination of plastic and other material such as fiber. A plurality of positioning pins 44, four in this embodiment, are arranged on the side of the linker 40 facing the magnet 30. The positioning pins 44 are cylindrical with axially extending surfaces on which several teeth 442 are formed for pressing against the inner surface of magnet 30 to position the magnet 30 in the radial direction. Because of the arrangement of the teeth 442, the magnet 30 can have a relatively large tolerance on the dimension of the inner diameter. A plurality of axial extending grooves 22, four in this embodiment, are formed on the outer surface of the core 20. The four positioning pins 44 of the linker 40 clamp into the four grooves 22 respectively. Several ridges 444 may also be formed on the surface of positioning pins 44 in contact with the grooves 22 so that the positioning pins 44 can clamp into the grooves 22 elastically. A couple of cylindrical projections 45 are arranged on the side of the linker 40 facing the magnet 30. The rotor core 20 has a couple of acceptance holes 24 for receiving the projections 45 therein such that the linker 40 is fixed to the rotor core 20. A mounting hole 48 is formed in the center of the linker 40. The shaft 10 passes through the mounting hole 48. The projections 45 may have ridges as well to form a tight interference fit within the acceptance holes to securely fix the linker to the core.

Optionally, the rotor further comprises a second linker 40 fixed to the other end of the core. The second linker 40 has the same structure and mates with the core and the magnet in the same way as the above first mentioned linker 40.

A plurality of balance pins 46 are arranged on the side of the linker 40 remote from the magnet 30. Dynamic balance of the rotor can be achieved by cutting some of the balance pins 46.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet rotor comprising a shaft, a rotor core fixed to the shaft, a magnet disposed around the core, and a linker fixed to at least one of the shaft and the rotor core and located at one end of the core, wherein elastic pins are formed on one of the linker and the magnet and matching recesses are formed in the other one of the linker and the magnet, said recesses being formed in one end of the magnet proximate the linker and said elastic pins being formed on one side of the linker facing the magnet, said elastic pins being resiliently pressed against side walls of the recesses by means of elastic deformation of the pins caused by pressing the pins into the recesses, and wherein said recesses have side walls which are divergent with the axially inner side being narrower than the axially outer open side, and an axial slot is formed through the distal end of each of the elastic pins.

2. The rotor of claim 1, wherein the magnet is a unitary hollow cylinder and the recesses are arranged uniformly in the circumferential direction of the magnet and through the wall of the magnet in the radial direction of the magnet.

3. A permanent magnet rotor comprising a shaft, a rotor core fixed to the shaft, a magnet disposed around the core, and a linker fixed to at least one of the shaft and the rotor core and located at one end of the core, wherein elastic pins are formed on one of the linker and the magnet and matching recesses are formed in the other of the linker and the magnet, wherein a plurality of grooves are formed on the outer surface of the rotor core, a plurality of positioning pins are arranged on the side of the linker facing the magnet, and the positioning pins are located in the grooves and have axially extending surfaces on which a plurality of teeth are formed, the teeth resiliently press against the inner surface of the magnet.

4. The rotor of claim 3, wherein a plurality of ridges are formed on the surface of the positioning pins in contact with the grooves so that the positioning pins resiliently grip the grooves.

5. The rotor of claim 3, wherein the magnet is a unitary hollow cylinder.

6. A permanent magnet rotor comprising a shaft, a rotor core fixed to the shaft, a magnet disposed around the rotor core, and a linker fixed to at least one of the shaft and the rotor core and located at one end of the rotor core; wherein an elastic clamping structure including elastic pins and recesses are formed between the linker and the magnet, and a plurality of balance pins are arranged on the side of the linker remote from the magnet, the elastic pins being formed on one of the linker and the magnet, the recesses being formed in the other one of the linker and the magnet with the elastic pins inserted therein, and rotational torque of the magnet being entirely transferred to the linker via the elastic clamping structure and then the torque at the linker being transferred to the shaft.

7. The rotor of claim 6, wherein said recesses are formed in one end of the magnet proximate the linker and said elastic pins are formed on one side of the linker facing the magnet, said elastic pins being resiliently pressed against side walls of the recesses by means of elastic deformation of the pins caused by pressing the pins into the recesses.

8. The rotor of claim 7, wherein said linker is made of plastic or a combination of plastic and fiber.

9. The rotor of claim 6, wherein a mounting hole is formed in the center of the linker and the shaft passes through the mounting hole.

10. The rotor of claim 6, wherein the rotor further comprises a second linker fixed to the other end of the core and said second linker and the magnet are connected by means of elastic fixation.

11. The rotor of claim 6, wherein the magnet is a unitary hollow cylinder.

12. The rotor of claim 6, wherein the linker is directly connected to the shaft, so that the torque at the linker is directly transferred to the shaft.

13. The rotor of claim 6, wherein the linker is connected to the shaft through the rotor core, so that the torque at the linker is transferred to the shaft through the rotor core.

* * * * *